(12) United States Patent
Kumata

(10) Patent No.: US 6,385,165 B1
(45) Date of Patent: May 7, 2002

(54) ADD-DROP MULTIPLEXER OF DUPLICATED CONFIGURATION HAVING INCREASED TRANSPORT CAPACITY

(75) Inventor: Junichi Kumata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/096,446

(22) Filed: Jun. 11, 1998

(30) Foreign Application Priority Data

Jun. 11, 1997 (JP) .............................................. 9-152737

(51) Int. Cl.[7] .............................. G01R 31/08; H04J 3/04
(52) U.S. Cl. ........................................ 370/216; 370/535
(58) Field of Search ................................. 370/219, 220, 370/221, 222, 225, 227, 228, 242, 535, 536, 537, 538

(56) References Cited

U.S. PATENT DOCUMENTS 5,978,353 A * 11/1999 Iwahori et al. ............. 370/217

* cited by examiner

Primary Examiner—Wellington Chin
Assistant Examiner—Brenda Pham
(74) Attorney, Agent, or Firm—Scully, Scott, Murphy & Presser

(57) ABSTRACT

An add-drop multiplexer includes first and second cross-connect systems. At least one pair of first and second protection switches and at least one pair of third and fourth protection switches are provided, the first protection switch being connected to an input port of the first cross-connect system. One of the second, third and fourth protection switches is connected to an input port of the second cross-connect system. An output port of the second cross-connect system is connected to the second, third and fourth protection switches through a node. A pair of fifth and sixth protection switches is connected to output ports of the first and second cross-connect systems. Signals from the fifth protection switch are multiplexed into an uplink high-speed signal and a downlink high-speed signal is demultiplexed into component signals which are supplied to input ports of the first and second cross-connect systems. Signals from the sixth protection switch are multiplexed into an uplink high-speed signal and a downlink high-speed signal is demultiplexed into component signals which are supplied to input ports on of the first and second cross-connect systems.

12 Claims, 4 Drawing Sheets

ADD-DROP MULTIPLEXER OF DUPLICATED CONFIGURATION HAVING INCREASED TRANSPORT CAPACITY

BACKGROUND OF THE INVENTION

1. Field of the Invention

The present invention relates generally Synchronous Optical Networks (SONET) and more specifically to a SONET add-drop multiplexer.

2. Description of the Related Art

A ring-topology interconnection network is formed of a plurality of add-drop multiplexers connected to an optical fiber ring. Each add-drop multiplexer includes a working system for multiplexing low-speed uplink signals to a high speed uplink signal and demultiplexing a high-speed downlink signal to a plurality of low-speed downlink signals. A spare system is provided to backup the working system. However, due to the duplicated structure, one half of the transfer capacity of the add-drop multiplexer is not utilized. Therefore, there is a need to increase the transport capacity of the add-drop multiplexer of duplicated configuration.

SUMMARY OF THE INVENTION

It is therefore an object of the present invention to provide an add-drop multiplexer of duplicated configuration that can double its transport capacity.

According to a first aspect of the present invention, there is provided an add-drop multiplexer of duplicated configuration, comprising a first low-speed working system, a first low-speed spare system, a second low-speed working system, a first high-speed system, a second high-speed system, and means for establishing a two-way connection between the first low-speed working system and one of the first and second high-speed systems and for establishing a one-way connection from one of the first low-speed spare system and the second low-speed working system to the second high-speed system and a one-way connection from the second high-speed system to the first low-speed spare system and the second low-speed working system.

In a preferred embodiment, the add-drop multiplexer further includes a second low-speed spare system, the arrangement being such that a one-way connection is established from one of the first low-speed spare system and the second low-speed working and spare systems to the second high-speed system and a one-way connection is established from the second high-speed system to the first low-speed spare system and the second low-speed working and spare systems. In a further preferred embodiment, the add-drop multiplexer further includes means for preventing the first low-speed spare system from recognizing a faulty condition of the second low-speed working and spare systems.

According to a second aspect, the present invention provides an add-drop multiplexer of duplicated configuration, comprising first and second cross-connect systems, at least one pair of first and second protection switches, the first protection switch being connected to an input port of the first cross-connect system, at least one third protection switch, at least one selector for selectively connecting one of the second, and third protection switches to an input port of the second cross-connect system, an output port of the second cross-connect system being connected to the second and third protection switches through a node, and a pair of fifth and sixth protection switches connected to output ports of the first and second cross-connect systems. A first multiplexer/demultiplexer is provided for multiplexing signals from the fifth protection switch into an uplink high-speed signal and demultiplexing a downlink high-speed signal into a plurality of signals and supplying the demultiplexed signals to input ports of the first and second cross-connect systems. A second multiplexer/demultiplexer multiplexes signals from the sixth protection switch into an uplink high-speed signal and demultiplexes a downlink high-speed signal into a plurality of signals and supplies the demultiplexed signals to input ports of the first and second cross-connect systems. In a preferred embodiment, the add-drop multiplexer further includes at least one fourth protection switch, the selector being arranged such that it selectively connects one of the second, third and fourth protection switches to an input port of the second cross-connect system, wherein the output port on the first side of the second cross-connect system is connected to the second, third and fourth protection switches through a node.

Preferably, the add-drop multiplexer further comprises a bit sequence generator for producing a predetermined bit sequence and a selector connected between the node and the second protection switch for selectively connecting one of the node and die bit sequence generator to the second protection switch.

BRIEF DESCRIPTION OF THE DRAWINGS

The present invention will be described in further detail with reference to the accompanying drawings, in which.

DETAILED DESCRIPTION

Figure 1:
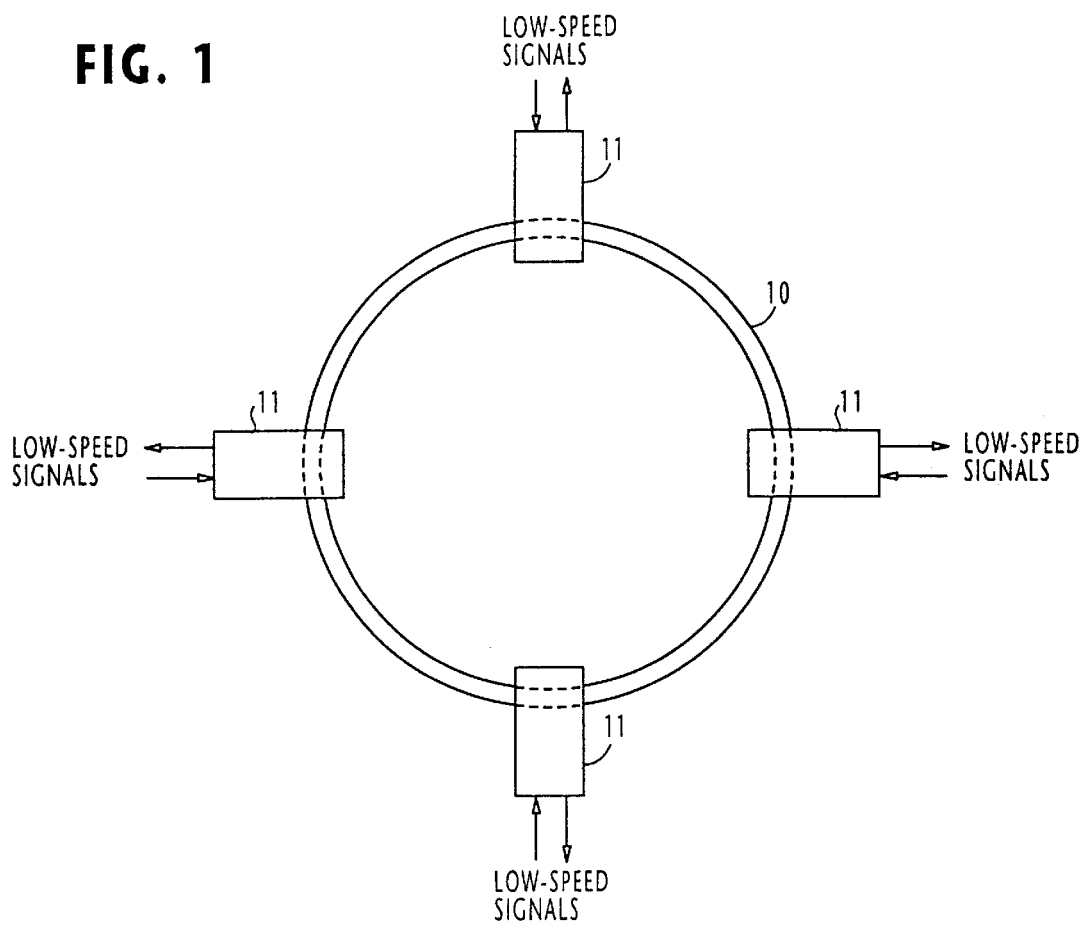
FIG. 1 is a schematic diagram illustrating a ring-topology interconnection network.

As shown in FIG. 1, an interconnection network of ring topology for a synchronous optical network (SONET) is formed of a fiber ring 10 and add-drop multiplexers 11 connected to the ring 10 for interfacing between high-speed optical TDM signals and low-speed optical TDM signals.

Figure 3:
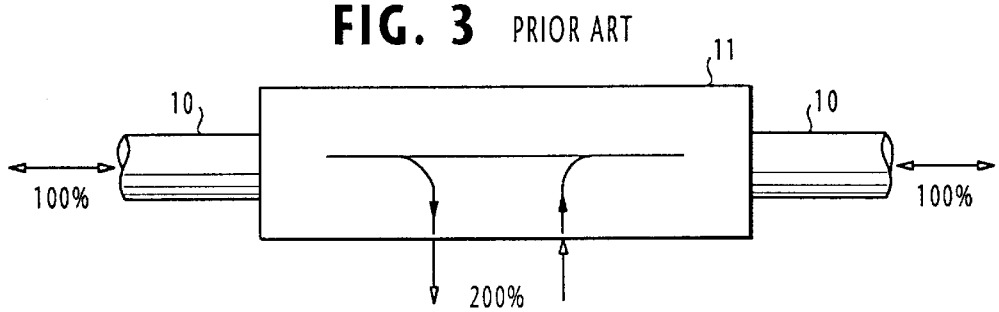
FIG. 3 is a schematic diagram illustrating the add-drop ratio of the prior art add-drop multiplexer.
Figure 2:
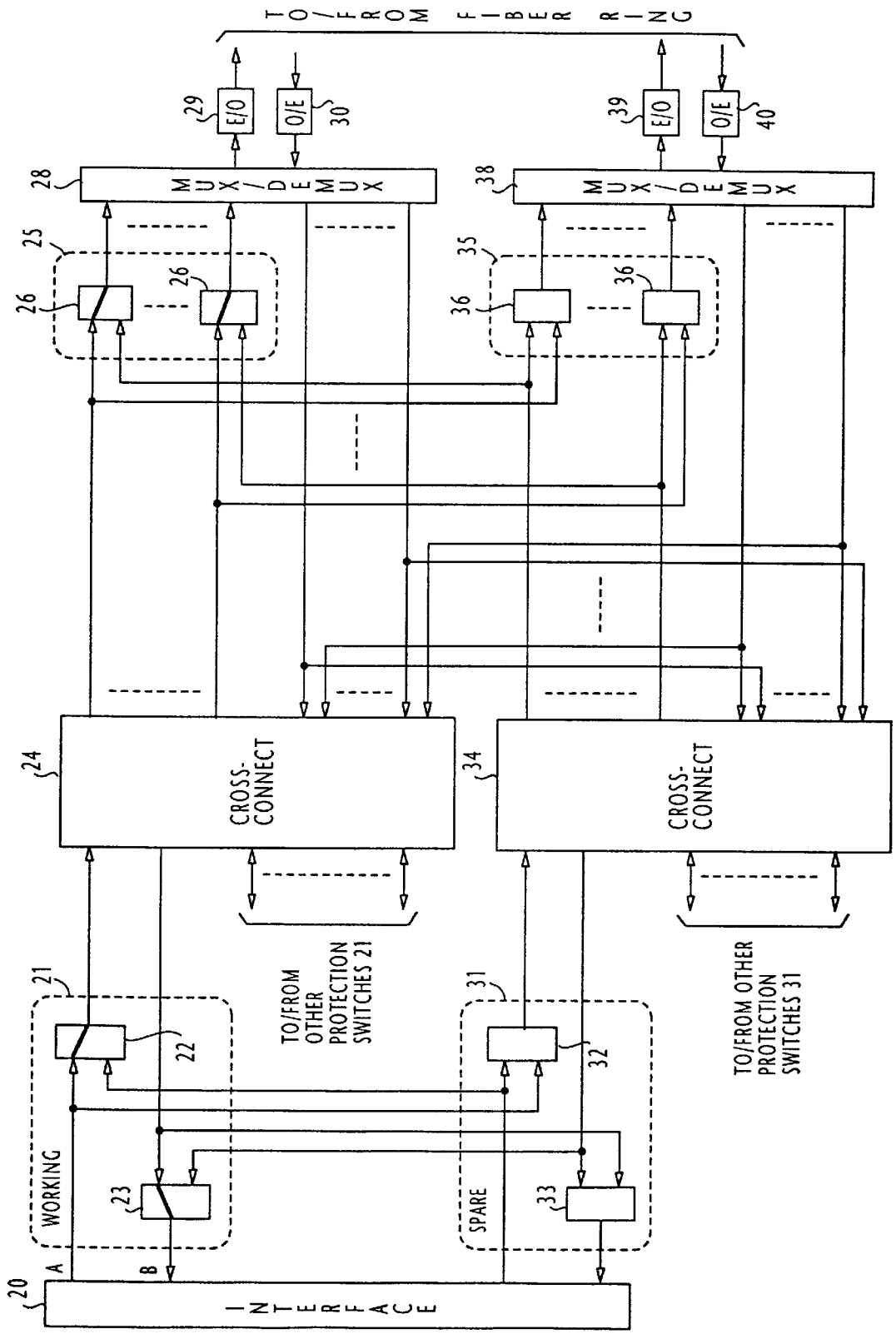
FIG. 2 is a block diagram of a prior art add-drop multiplexer used in the interconnection network of FIG. 1.

Before proceeding with the detailed description of the present invention, it may prove helpful to provide an explanation of a prior art add-drop multiplexer with reference to FIGS. 2 and 3. In FIG. 2, each add-drop multiplexer is of a duplicated configuration having a working protection switch 21 and a spare protection switch 31 on the low-speed side of the add-drop multiplexer. Selectors 22, 23 of working switch 21 are cross-coupled to selectors 32, 33 of the duplicated spare switch 31 for switching signals between an interface 20 that interfaces low-speed optical TDM signals and digital cross-connect systems 24 and 34 which are also duplicated. On the high-speed side of the add-drop multiplexer, a working protection switch 25 is connected between the cross-connect system 24 and a working multiplexer/demultiplexer 28, and a duplicated spare protection switch 35 is connected between the cross-connect system 34 and a spare multiplexer/demultiplexer 38, these multiplexer/demultiplexers being connected to the fiber ring 10 via electrooptic transducers 29, 39 and optoelectric transducers 30, 40. Protection switches 25 and 35 are formed of a plurality of selectors 26 and 36, respectively. Output ports of the cross-connect system 24 are connected to the upper input ports of selectors 26 and to the lower input ports of selectors 36, while the corresponding output ports of the cross-connect system 34 are connected respectively to the lower input ports of selectors 26 and to the upper input ports of selectors 36.

Normally, all the selectors of the working switches 21 and 25 are switched to their upper position as indicated by thick lines. For uplink transmission from the interface 20 to the fiber ring 10, a low-speed TDM input signal from a terminal "A" of the interface 20, for example, is supplied to one input port of the cross-connect system 24, where time-slot interchange is performed between the time slots of the input port and the time slots of one or more of its output ports, so that the component signals of the input TDM signal are switched to predetermined time slots of uplink TDM signals and supplied to the multiplexer/demultiplexer 28 where these uplink TDM signals are time-division multiplexed into a high-speed TDM signal. This high-speed TDM signal is then converted to an optical signal by the electrooptic transducer 29 and launched into the fiber ring 10.

For downlink transmission from the fiber ring 10 toward the interface 20, a high-speed TDM optical signal on the fiber ring 10 is transformed into a corresponding electrical signal by the optoelectric transducer 30 and demultiplexed by the multiplexer/demultiplexer 28 to recover its low-speed TDM components, which are coupled to corresponding terminals of the cross-connect systems 24 and 34. Cross-connect system 24 performs interchange on the downlink TDM signals in the same manner as that performed on the uplink TDM signals. Each of these downlink TDM signals from the cross-connect system 24 is coupled through selector 23 to a terminal "B" of the interface 20.

It will be seen that, in each ADM of the ring-topology interconnection network, only one half of the transfer capacity of the fiber ring 10 is used by the working units of its duplicated structure. If the high speed signal of the fiber ring is taken as 100%, the ratio of the high speed to the low speed signals (known as add-drop ratio of an ADM) has a maximum of 200% because of the duplicated structure. If a total of high speed signals is 2.4 Gbits/s on the fiber ring 10 for an add-drop ratio of 200%, each add-drop multiplexer can accommodate a total of 4.8 Gbits/s of low speed signals as illustrated in FIG. 3. However, there is still a need to provide an add-drop multiplexer having an add-drop ratio higher than 200 percent.

Figure 4:
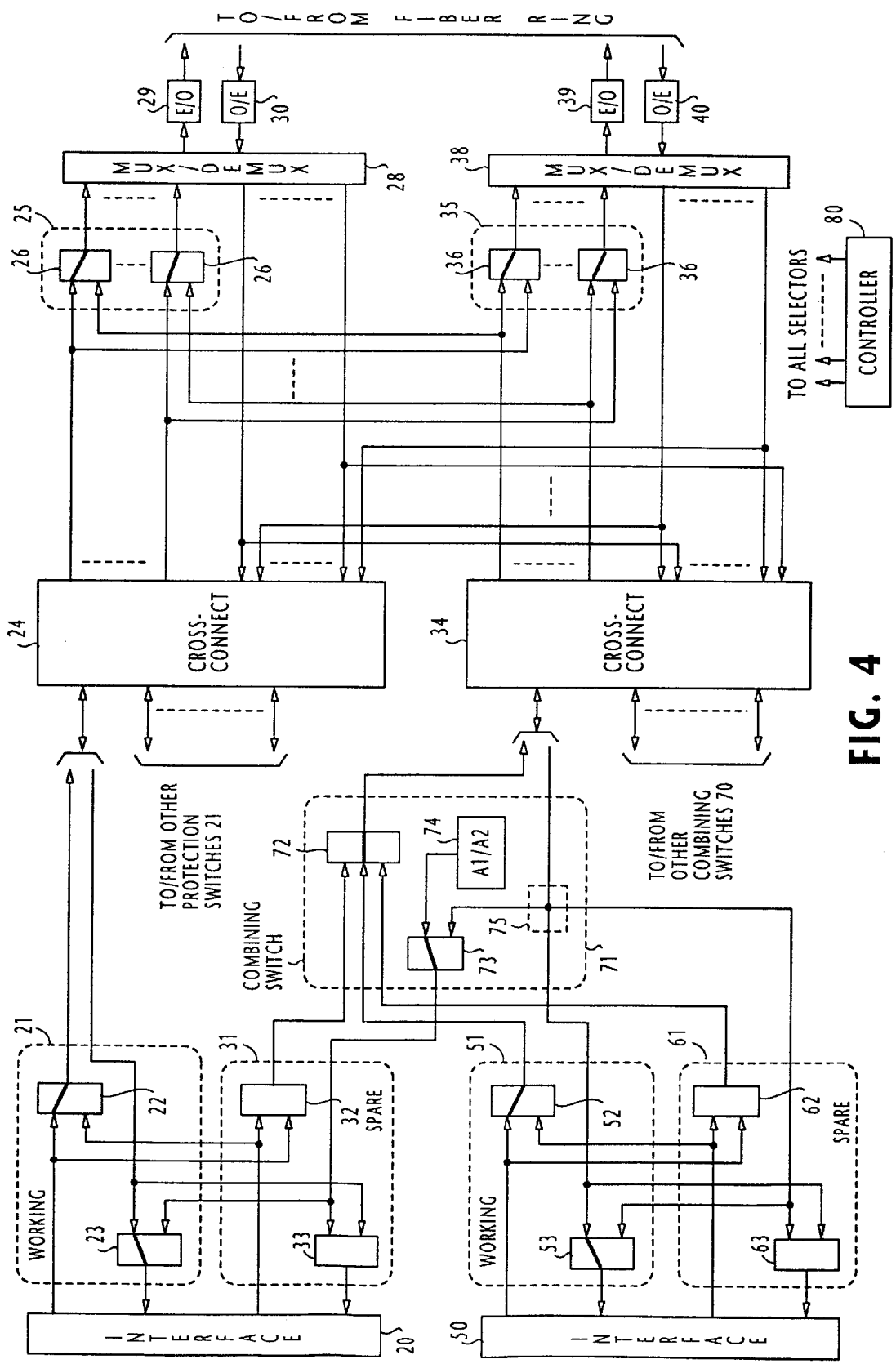
FIG. 4 is a block diagram of an add-drop multiplexer of the present invention.

Referring to FIG. 4, the add-drop multiplexer of the present invention is illustrated. The add-drop multiplexer of this invention differs from the prior art in that it additionally includes an interface 50, a working protection switch 51 formed of selectors 52, 53 and a spare protection switch 61 formed of selectors 62, 63 which are cross-coupled to the selectors 52 and 53 in the same way as the selectors of switches 21 and 31. Further provided is a combining switch 71 comprising selectors 72 and 73. Selector 72 selectively connects one of the outputs of selectors 32, 52 and 62 to an input port of the duplicated cross-connect system 34 and selector 73 connects one of its inputs to the selector 33.

An idle bit sequence generator 74 is provided for supplying the A1 and A2 bit sequences of the transport overhead of the SONET frame format to the upper input port of the selector 73. An output port of the cross-connect system 34 is connected via a splitter, or node 75 to the lower input port of selector 73, the upper input port of selector 53 and the lower input port of selector 63. All selectors are controlled by a controller 80.

In addition to the transmission between the interface 20 and the fiber ring 10, the add-drop multiplexer of this invention allows normal transmission between the interface 50 and the fiber ring using the cross-connect system 34 and the protection switch 35 as working units. This is achieved by setting the selector 72 to the middle position and setting the selectors 36 to the upper position as indicated by thick lines so that an uplink signal from the switch 51 passes through the selector 72, cross-connect system 34, and one of the selectors 36 to the multiplexer/demultiplexer 38 and forwarded onto the fiber ring 10 via the E/O transducer 39, and a downlink signal from the multiplexer/demultiplexer 38 passes through the cross-connect system 34 and splitter 75 to the switch 51.

If the working switch 51 should fail, the selector 62 is switched to the upper position and the selector 72 to the lower position for coupling an uplink signal from the interface 50 to the cross-connect system 34, and the selector 63 is switched to the upper position for coupling a downlink signal from the splitter 75 to the interface 50.

Figure 5:
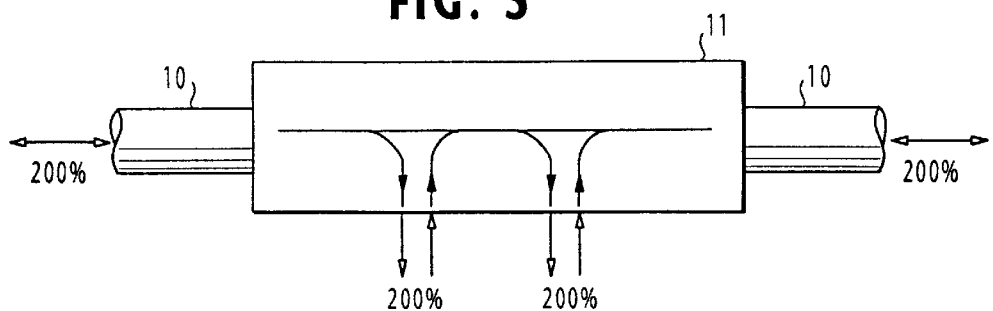
FIG. 5 is a schematic diagram illustrating the add-drop ratio of the add-drop multiplexer of the present invention.

With this arrangement, the transfer capacity of the add-drop multiplexer on the high-speed side is increased to 200% and the transfer capacity of its low-speed side is increased to 400% as shown in FIG. 5. Thus, an add-drop ratio of 400% is achieved.

These additional units may be installed in an existing add-drop multiplexer as add-on units or installed in a new add-drop multiplexer during manufacture.

If the additional units are installed as add-on units, it is preferable that the existing spare units are not informed of the occurrence of a failure in the add-on units since they are designed to back up the existing working units. For this purpose, when the selector 72 is in the lower or middle position, the selector 73 is switched to the upper position to supply the output of the idle bit sequence generator 74 to the existing spare protection switch 31 to prevent the failure of an add-on unit from being mistaken by the existing spare system as an indication of the failure of an existing working unit.

If the working switch 31 should fail, the selector 32 is switched to the upper position and the selector 72 to the upper position for coupling an uplink signal from the interface 20 to the cross-connect system 34, and the selector 33 is switched to the upper position and the selector 73 to the lower position for coupling a downlink signal from the splitter 75 to the interface 20. If the multiplexer/demultiplexer 28 should fail) the selector 36 are switched to the lower position to connect the multiplexer/demultiplexer 38 to the cross-connect 24 so that it takes over the failed unit.

Therefore, when a failure occurs in the existing system, the operation of the add-on system is interrupted and the existing unit such as cross-connect system 34 or protection switch 35 takes over the failed unit.

Figure 6:
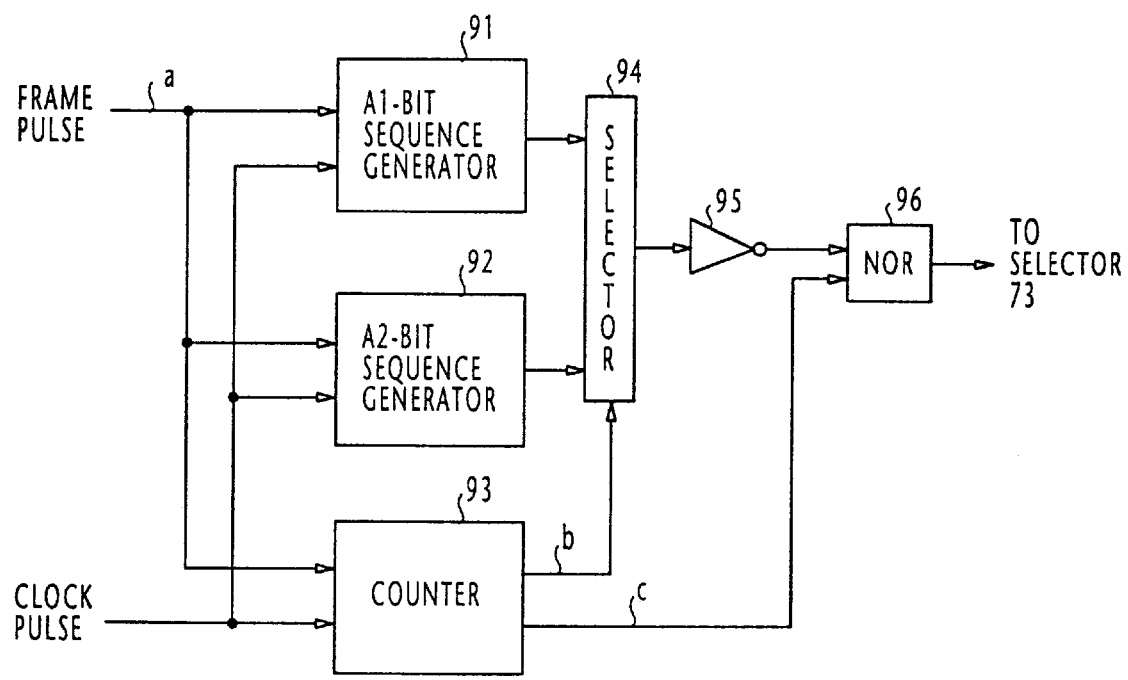
FIG. 6 is a circuit diagram of the idle bit sequence generator of FIG. 4.
Figure 7:
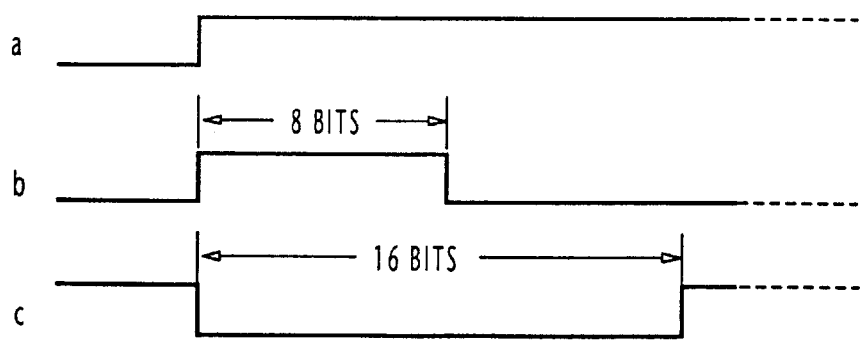
FIG. 7 is a timing diagram associated with FIG. 6.

As shown in FIG. 6, the idle bit sequence generator 74 comprises an A1-bits sequence generator 91, an A2-bit sequence generator 92 and a counter 93, all of which are supplied with clock pulses and frame pulses. In response to a frame pulse "a" (see FIG. 7), an 8-bit A1 sequence "11110110" and an 8-bit A2 sequence "00101000" are repeatedly supplied from the sequence generators 91, 92 to a selector 94. Counter 93 supplies a control pulse "b" of 8-bit duration to the selector 94 to cause it to sequentially select the A1 and A2 bit sequences. The output of the selector 94 is reversed in polarity by an inverter 95 and fed to one input of a NOR gate 96. Counter 93 further supplies a negative pulse "c" of 16-bit duration to the other input of the NOR gate 96. When the inverted bit patterns of A1 and A2 sequences are being supplied to the NOR gate 96, it is enabled by a sequence of 16-bit all zero's set by the pulse "c". Thereafter, the NOR gate 96 is disabled by a sequence of all 1's that follows, so that the positions of the transport overhead other than the A1 and A2 bit positions are set to all zeros. The output of the NOR gate 96 is therefore a sequence of A1 and A2 bit patterns at the start of a frame, which is supplied via the selector 73 to the selector 33 of existing spare switch 31.

What is claimed is:

1. An add-drop multiplexer of duplicated configuration comprising:
    a first low-speed working system;
    a first low-speed spare system;
    a second low-speed working system;
    a first high-speed system;
    a second high-speed system;
    means for establishing a two-way connection between the first low-speed working system and one of the first and second high-speed systems and for establishing a one-way connection from one of the first low-speed spare system and the second low-speed working system to said second high-speed system and a one-way connection from said second high-speed system to said first low-speed spare system and said second low-speed working system; and
    means for preventing said first low-speed spare system from recognizing a fault condition of said second low-speed working system.

2. An add-drop multiplexer as claimed in claim 1, wherein said establishing means comprises duplicated cross-connect systems.

3. An add-drop multiplexer of duplicated configuration comprising:
    a first low-speed working system;
    a first low-speed spare system;
    a second low-speed working system
    a second low-speed spare system
    a first high-speed system;
    a second high-speed system;
    means for establishing a two-way connection between the first low-speed working system and one of the first and second high-speed systems and for establishing a one-way connection from one of the first low-speed spare system and the second low-speed working and spare systems to said second high-speed system and a one-way connection from said second high-speed system to said first low-speed spare system and said second low-speed working and spare systems; and
    means for preventing said first low-speed spare system from recognizing a fault condition of said second low-speed working and spare systems.

4. An add-drop multiplexer as claimed in claim 3, wherein said establishing means comprises duplicated cross-connect systems.

5. An add-drop multiplexer of duplicated configuration, comprising:
    a first cross-connect system;
    a second cross-connect system;
    at least one pair of first and second protection switches, the first protection switch being connected to an input port of the first cross-connect system;
    at least one third protection switch;
    at least one selector for selectively connecting one of the second and third protection switches to an input port of the second cross-connect system, an output port of the second cross-connect system being connected to the second and third protection switches through a node;
    a pair of fourth and fifth protection switches connected to output ports of the first and second cross-connect systems;
    a first multiplexer/demultiplexer for multiplexing signals from the fourth protection switch into an uplink high-speed signal and demultiplexing a downlink high-speed signal into a plurality of signals and supplying the demultiplexed signals to input ports of the first and second cross-connect systems; and
    a second multiplexer/demultiplexer for multiplexing signals from the fifth protection switch into an uplink high-speed signal and demultiplexing a downlink high-speed signal into a plurality of signals and supplying the demultiplexed signals to input ports of the first and second cross-connect systems.

6. An add-drop multiplexer as claimed in claim 5, further comprising:
    a bit sequence generator for producing a predetermined bit sequence; and
    a selector connected between said node and the second protection switch for selectively connecting one of said node and said bit sequence generator to said second protection switch.

7. An add-drop multiplexer as claimed in claim 6, wherein said bit sequence is one of overhead bit patterns of SONET frames.

8. An add-drop multiplexer as claimed in claim 5, wherein the first and second protection switches are cross-coupled to each other.

9. An add-drop multiplexer of duplicated configuration, comprising:
    a first cross-connect system;
    a second cross-connect system;
    at least one pair of first and second protection switches, the first protection switch being connected to an input port of the first cross-connect system;
    at least one pair of third and fourth protection switches;
    at least one selector for selectively connecting one of the second, third and fourth protection switches to an input port of the second cross-connect system, an output port of the second cross-connect system being connected to the second, third and fourth protection switches through a node;
    a pair of fifth and sixth protection switches connected to output ports of the first and second cross-connect systems;
    a first multiplexer/demultiplexer for multiplexing signals from the fifth protection switch into an uplink high-speed signal and demultiplexing a downlink high-speed signal into a plurality of signals and supplying the demultiplexed signals to input ports of the first and second cross-connect systems; and
    a second multiplexer/demultiplexer for multiplexing signals from the sixth protection switch into an uplink high-speed signal and demultiplexing a downlink high-speed signal into a plurality of signals and supplying the demultiplexed signals to input ports of the first and second cross-connect systems.

10. An add-drop multiplexer as claimed in claim 9, further comprising:
  a bit sequence generator for producing a predetermined bit sequence; and
  a selector connected between said node and the second protection switch for selectively connecting one of said node and said bit sequence generator to said second protection switch.

11. An add-drop multiplexer as claimed in claim 10, wherein said bit sequence is one of overhead bit patterns of SONET frames.

12. An add-drop multiplexer as claimed in claim 9, wherein the first and second protection switches are cross-coupled to each other and the third and fourth protection switches are cross-coupled to each other.

* * * * *